UNITED STATES PATENT OFFICE.

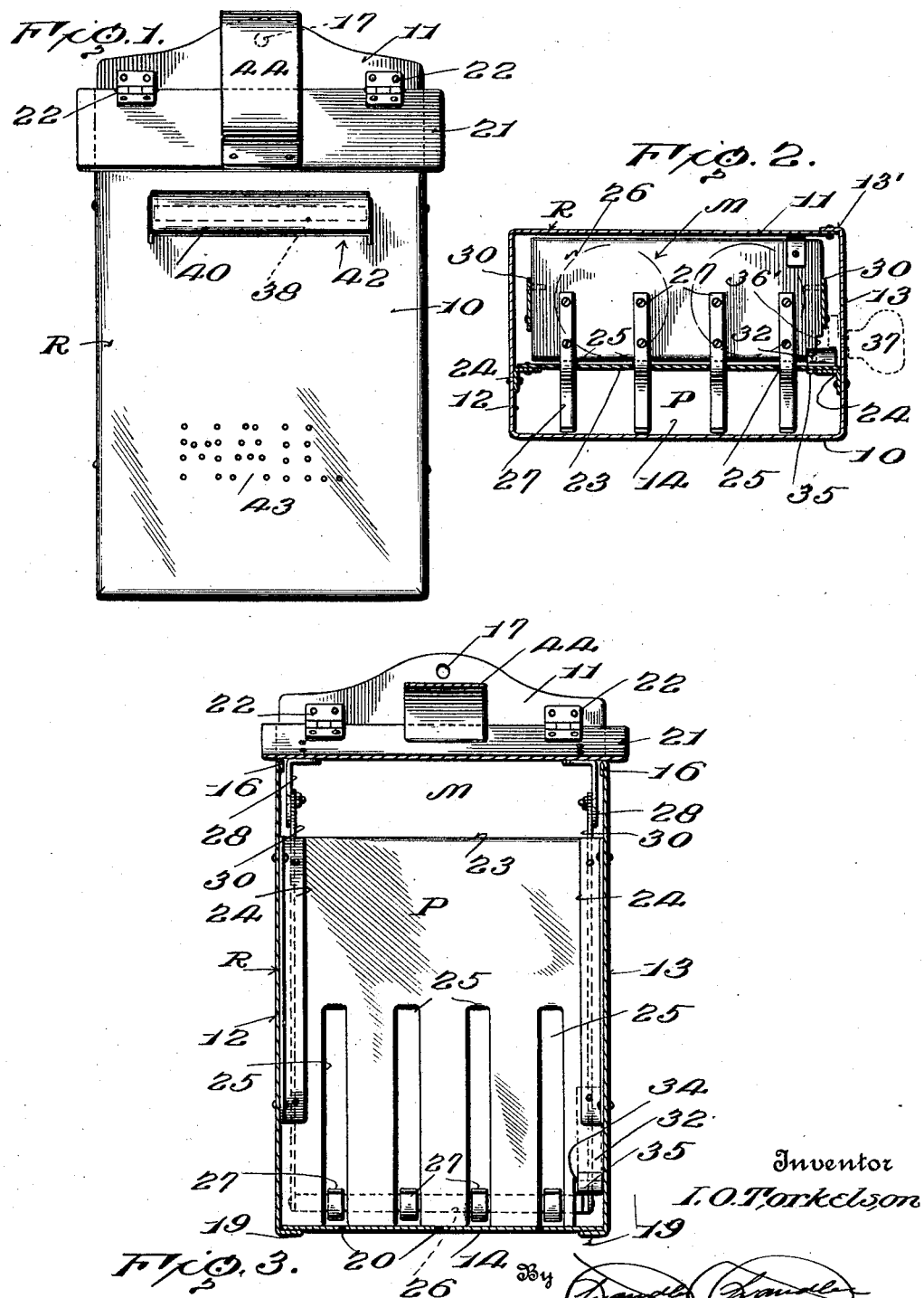

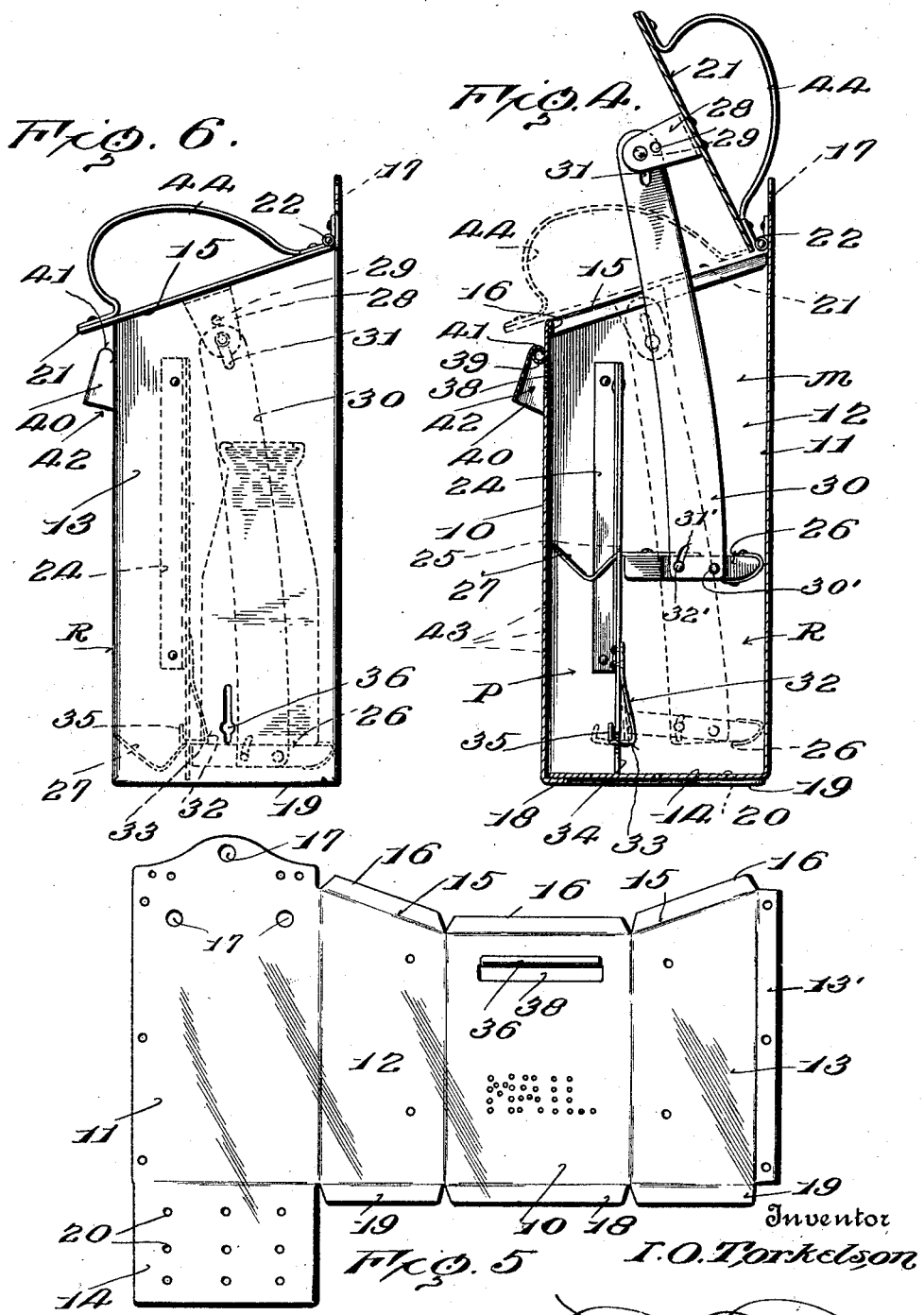

ISAK O. TORKELSON, OF NEW BRIGHTON, NEW YORK, ASSIGNOR OF ONE-HALF TO LARS O. TORKELSON, OF NEW BRIGHTON, NEW YORK.

COMBINATION MILK AND MAIL BOX.

1,313,354.     Specification of Letters Patent.     Patented Aug. 19, 1919.

Application filed January 24, 1919. Serial No. 272,910.

*To all whom it may concern:*

Be it known that I, ISAK O. TORKELSON, a citizen of the United States, residing at New Brighton, in the county of Richmond, State of New York, have invented certain new and useful Improvements in Combination Milk and Mail Boxes; and I do hereby declare the following to be a full, clear, and exact description of the invention, such as will enable others skilled in the art to which it appertains to make and use the same.

This invention relates to the class of deposit and collection receptacles, and more especially to an improved box for receiving milk in bottles and the like, and mail therein, and for insuring safe keeping thereof, until removed by the owner or customer to whose door the same is delivered.

The invention further comprehends an improved construction of deposit and collection receptacle which will obviate the necessity of leaving bottles of milk or the like on stoops or without protection and subject to access by cats, dogs and the like, and thus liable to contagion or devourment, breakage or otherwise stolen or misappropriated, the device also serving to receive mail, and comprising a box having a hinged cover from which is suspended or hung, a platform adapted to support the bottles or the like placed within the box, while a key operated lock is provided to coöperate with the platform to secure the hinged cover or lid in closed position when the bottles of milk or the like have been placed in the box, thereby insuring safe delivery.

The invention further comprehends an improved construction of a deposit and collection receptacle or box made up of a blank section of sheet metal and provided with a hinged cover to protect the contents, while disposed within the box is a vertical partition arranged transversely to divide the receptacle into two compartments, one for receiving milk bottles and the other for receiving mail and adapted through the medium of a platform pivotally secured to the cover, to be held in a raised position when empty, said platform also acting upon the opposite sides of the partition so as to elevate the bottles and mail when the cover is raised upon being released by the key actuated means coöperating with the platform as will be particularly pointed out, so as to permit convenient removal of both the milk and the mail as desired.

With the above objects and others in view, as will appear, as the specification proceeds, the invention comprises certain novel combinations and arrangements of parts as will be hereinafter more particularly pointed out and set forth in detail in the appended claims.

Reference is had to the accompanying drawings forming a part of this application, wherein like reference characters indicate corresponding parts throughout the several views, and wherein:—

Figure 1 is a front elevation of my improved combination milk and mail box.

Fig. 2 is a horizontal sectional view thereof.

Fig. 3 is a vertical sectional view taken across the box.

Fig. 4 is a similar view showing the box cover in raised position and taken transversely of the box, with parts in elevation.

Fig. 5 is a detail view of a blank from which the box is made, and

Fig. 6 is a side elevation of the key receiving side, and showing the parts in dotted lines in position when the cover is closed.

Referring to the drawings in detail, my improved combination milk and mail box, comprises a receptacle R preferably of rectangular cross section and comprising a front wall 10 and a back wall 11, side walls 12 and 13 and a bottom 14. This receptacle is preferably made up of a single section of blank material in which the sides 12 and 13 are made contiguous with the edges of the front wall 10 and the back wall 11 contiguous with the edge of the side 12, the contiguous edges being vertical edges. The bottom portion 14 is formed contiguous with the lower edge of the rear wall 11.

The front wall 10 is also made of less height than the rear wall 11, the sides 12 and 13 thus having sloping top edges 15 which like the upper edge of the front wall 10, are preferably turned downwardly and inwardly as shown at 16 to provide a non-cutting edge as a safety against injury to the person obtaining access to the box. The top edge also slopes forwardly, from which the rear wall 11 projects upwardly, the rear wall being suitably apertured as shown at 17, so as to permit the box to be nailed or otherwise secured to a vertical wall or other upright support in convenient position for the depositing and removal of the contents.

In order to secure the walls in assembled position at right angles to each other, in the manner specified, the front wall is provided with a tongue extension strip 18 and the sides 12 and 13 with similar extension strips or tongues 19 which latter are all bent inwardly at right angles beneath the bottom portion 14 after the latter is bent forwardly at right angles with respect to the back wall 11, so as to be arranged beneath and to sustain said bottom wall for all practical purposes, since said bottom wall does not receive the weight of the milk bottles and contents of the box or the mail, in a manner as will be hereinafter pointed out. The side 13 is also provided with a vertical tongue 13' at its free edge, bent forwardly at right angles thereto against the rear face of the back wall 11, to which it is riveted in order to complete the inclosure. The bottom wall 14, however, is provided with a series of openings 20 to provide for the drain of the box as well as for ventilation.

Hinged at the back wall 11 on a line connecting the extreme upper end of the side edges of the sides 12 and 13, is a cover 21, the hinges thereof being designated at 22 and being riveted or otherwise secured to the back wall 11 and the top or cover 21 so as to prevent the cover from being removed and access being had to the box for removing the contents thereof unauthorizedly.

Arranged vertically across the box on the inside, is a partition 23 preferably secured to the opposed sides 12 and 13 through the medium of rightangular cleats 24 which are riveted to said respective sides and the partition so as to rigidly support the latter with its lower edge resting upon the bottom of the box and with its upper edge terminating short of the top of the box, as is clearly shown in the drawings. This partition is also provided with a series of vertical slots 25 in its lower portion, said slots being located in spaced parallel relation and extending from the lower edge thereof or the bottom of the box, to a point spaced from the upper edge of the partition or substantially one half of the height thereof. The purpose of these slots will presently appear.

Movable in the compartment M as distinguished from the compartment P provided in rear and in front of the partition 23, respectively, is a platform 26, said platform having fork-shaped tines 27 bolted or otherwise secured thereto and projecting through the slots 25 into the compartment P to sustain and elevate mail deposited in the box as will later be described. The platform is hung or suspended from the cover 21 and for this purpose, there is secured to the bottom surface of the cover, a pair of opposed parallel and depending rightangular brackets 28 disposed intermediately between the front and rear edges of the cover near the side edges thereof and each having a pair of openings 29 therethrough for bolting or riveting the upper ends of the hangers 30 therethrough. These upper ends are provided with slots 31 to allow compensating movement so that the platform will be sustained in a slightly raised position supporting the bottles thereon in the compartment M when empty. To accomplish this, there is provided in the partition 23, a spring 32, anchored at its upper end and having its lower end entered forwardly to provide a rightangled shoulder 33, with the free end extending through a slot 34 in the partition 23 and turned upwardly as shown at 35, so as to limit the rearward displacement of the spring.

The platform is designed to be sustained by the spring and thereby hold the cover in an open position for permitting the placing of the bottles therein containing milk but with the contents in the bottles, the platform will be lowered below the shoulder 33 and the cover will thereby be locked in a closed position to exclude all foreign matter and prevent unauthorized removal of the bottles. To assist the sustaining and closing action of the platform and cover, the hinges 30 are pivoted at their rear lower corners to the side edges of the platform 26, as shown at 30', and provided at their front lower corners, with adjacent vertical arcuate slots 31' concentric to the pivots in which pins 32' carried by the edges of the platform are engaged. In this manner, the engaging action of the platform against the key operated locking device or spring 32 is cushioned, so that the platform will be supported in the manner shown in dotted lines in Fig. 4 of the drawings, thereby sustaining the empty bottles while permitting the cover to move to a closed position to protect the contents, assisted by the action of the loose or compensating connection afforded by the engagement of the pivots in the slots 31, between the brackets 28 and the hangers 30. When the filled bottles are placed in the box upon the platform, the platform will repress and pass by and beneath the spring catch 32' the connections or pins 32' moving downwardly in the slots 31' as the platform moves to its lowest limit, and the slots 31 permitting the hangers 30 to move downwardly.

There is disposed in the side wall 13 however, a key hole 36 for receiving a key 37, by means of which the spring catch can be depressed against the partition 23 so as to permit the raising or opening of the cover or top of the box or receptacle and thus the elevation or raising of the platform through the medium of the connection of the cover with the platform by the hangers as described, whereby the contents can be removed. The platform is notched as shown at 36' to accommodate the bit of the key 37 in order to actuate the spring catch as described. It will be understood that the compartment M is for the purpose of containing the milk bottles as described and the compartment P is for receiving mail to be simultaneously projected above the top of the box as described. In order to deposit mail into the compartment P there is provided in the front wall 10 of the box, a slot 38 at the upper edge of which an upwardly and inwardly turned bead 39 is provided forming a pivotal hanger for a drop lid or cover 40 having its upper edge 41 turned downwardly and inwardly to interfit the bead 39 and having its opposed ends turned inwardly to prevent displacement of the cover and protect the contents of the compartment as shown at 42. In the front of the box the word "Mail" is perforated as shown at 43, so that it may be discerned without opening the box, whether there is any mail in the compartment P. A band 44 is also provided for the cover or lid 21, to receive newspapers and the like. It is also to be noted that said cover or lid projects over the edges of the sides and front wall, thereby excluding rain water and the like.

In this manner, it will be seen that I have provided an effective device or box for containing bottles of milk or other food and protecting the same against being stolen or contamination by access having been had thereto by cats, dogs or other animals, thus insuring that the bottles or the like will be received in a clean and sanitary condition. The placing and removal of the mail may be carried on with efficiency, the safe retention thereof until removed, being insured also.

What is claimed is:—

1. A combined milk and mail box, comprising a receptacle having means of supporting the same, a hinged cover for the receptacle, a vertical partition in the receptacle, dividing the same into a plurality of compartments, a platform movable in one of the compartments and having tines projecting into the other compartments, hangers suspending the platform from the cover, means to secure said platform in a lowered position with the cover closed or to release the latter and means to permit the platform to be partially sustained against locking when the cover is closed in an unlocked position.

2. A deposit and collection receptacle of the class described comprising an inclosure having means of suspending the same against a vertical support, a partition arranged across the receptacle and dividing the same into front and rear compartments, a platform movable in the rear compartment and having projecting portions extending through the partition and into the front compartment, hangers extending upwardly from the platform, brackets depending from the cover and pivotally connected to the hangers, said hangers being slotted where connected to the brackets, and key operated means for securing the platform in a lowered position with the cover closed or for releasing the same to permit raising of the cover and removal of the contents, raising of the cover causing elevation of the platform to project the contents above the open edge of the receptacle.

3. A combined milk and mail box comprising a receptacle having sloping sides and a front wall provided with an opening therein, brackets at the opposed inner faces of the sides of the receptacle, a partition secured thereto and having a plurality of vertical parallel slots in its lower portion, a platform movable in rear of the partition and having a plurality of tines projecting forwardly through said slots for movement therein to elevate the contents of the compartment resting thereon, hangers extending upwardly from the opposed edges of the platform and having slots in their upper ends, angular brackets depending from the cover and pivotally connected through said slots, said cover being hinged to the rear wall of the receptacle, and means for holding said platform lowered with the cover closed or for releasing the same to permit opening of the cover to remove the contents, as and for the purposes specified.

4. A combined milk and mail box comprising a receptacle having sloping sides and a front wall provided with an opening therein, brackets at the opposed inner faces of the sides of the receptacle, a partition secured thereto and having a plurality of vertical parallel slots in its lower portion, a platform movable in rear of the partition and having a plurality of tines projecting forwardly through said slots for movement therein to elevate the contents of the compartment resting thereon, hangers extending upwardly from the opposed edges of the platform and having slots in their upper ends, angular brackets depending from the cover and pivotally connected through said slots, said cover being hinged to the rear wall of the receptacle, said receptacle comprising a single blank section of metal having opposed front and rear walls and side walls, a bottom formed at the bottom of the rear wall, tongues formed at the lower edges of the side and front walls and extending beneath said bottom, said bottom being perforated, said partition having a slot in its lower portion adjacent one side, and a spring secured to said partition and having a forwardly bent portion at its lower end with the free extremity thereof extending upwardly to restrict the distension of the spring and producing a shoulder designed to engage over the platform for retaining the latter in a lowered position when the cover is closed, said side wall having a key opening therein adapted to receive a key for depressing the spring to release the platform to permit raising of the latter to eject the contents of the compartment in front and in rear of the partition when the cover is opened.

5. In a deposit and collection receptacle, a container, said container having an open top and having the remaining walls thereof closed, a movable closure for said open top, a vertical partition in the container, a platform movable in the container at one side of the partition and having portions projecting through the partition to operate in the compartment in the other side thereof, brackets depending from the closure, hangers having slotted connections with the brackets for pivotal movement with respect thereto, said hangers having slotted pivotal connections with the platform at the lower ends thereof, means for obtaining access to one of said compartments through the front wall of the container and repressible means for supporting the platform slightly elevated to permit raising thereof with the closure or to lock the same at its lower limit.

6. In a deposit and collection receptacle, a container, said container having an open top and having the remaining walls thereof closed, a movable closure for said open top, a vertical partition in the container, a platform movable in the container at one side of the partition and having portions projecting through the partition to operate in the compartment at the other side thereof, brackets depending from the closure, hangers having slotted connections with the brackets for pivotal movement with respect thereto, said hangers having slotted pivotal connections with the platform at the lower ends thereof, said partition being slotted, a spring member anchored thereto and depending therefrom, said spring having a rebent portion engaging through the slot and adapted to sustain the platform partly elevated at times, said slotted connections between the brackets and hangers, and the hangers and platform, serving to relieve the abutting engagement of the platform with the spring member to assist in sustaining the platform in a partly elevated position as specified, said container having a key hole in the wall adjacent the slot to receive a key for repressing the spring member from over the platform, to permit opening of the closure to elevate the platform for projecting the contents, as and for the purposes specified.

In testimony whereof I affix my signature in the presence of two witnesses.

ISAK O. TORKELSON.

Witnesses:
L. O. TORKELSON,
OLIVE E. SHARRETT.

Copies of this patent may be obtained for five cents each, by addressing the "Commissioner of Patents, Washington, D. C."